Oct. 10, 1944. W. J. DILLNER 2,360,046
DEVICES FOR STORING AND TRANSPORTING GOODS
Filed Sept. 16, 1942 2 Sheets-Sheet 1

William J. Dillner,
INVENTOR.
BY Ernie Adamson
Attorney.

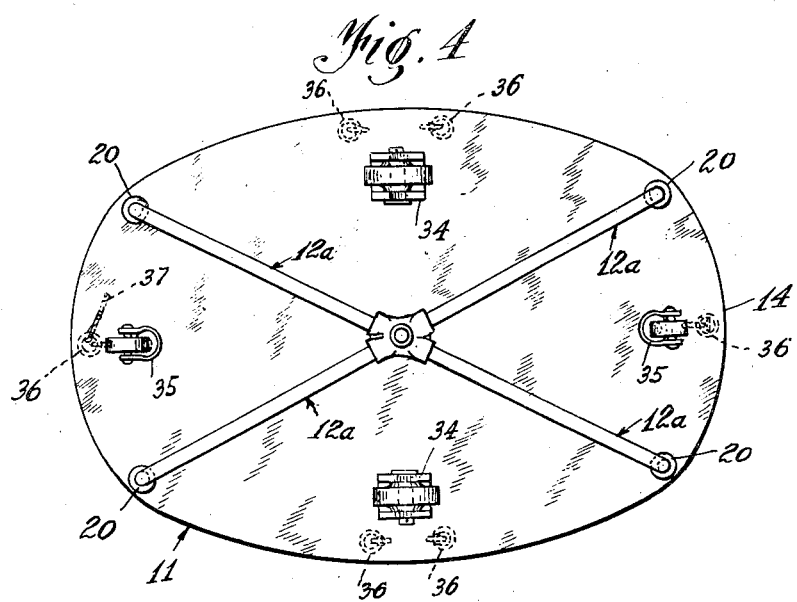
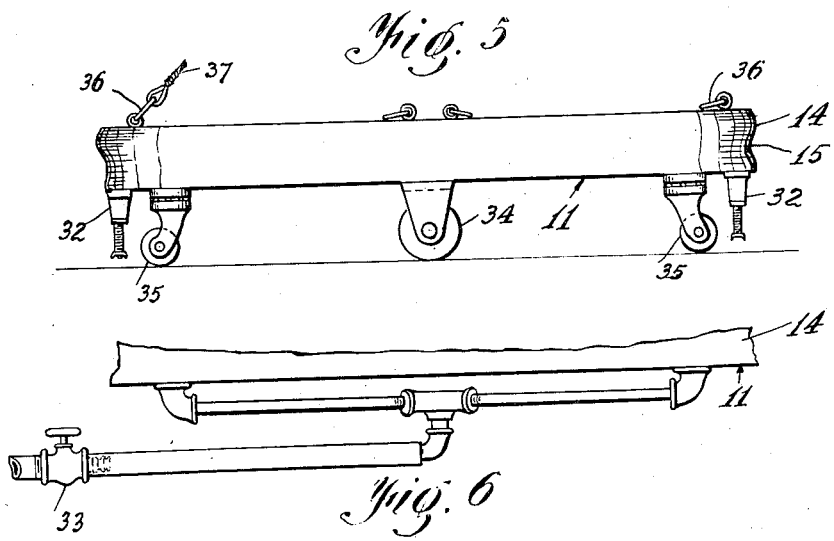

Patented Oct. 10, 1944

2,360,046

UNITED STATES PATENT OFFICE 2,360,046

DEVICE FOR STORING AND TRANSPORTING GOODS

William J. Dillner, Pittsburgh, Pa.

Application September 16, 1942, Serial No. 458,602

1 Claim. (Cl. 21—61)

This invention relates to a portable device for storing and transporting goods or foods and more particularly to a device in which goods or materials of all kind may be protected from vermin, moths or deterioration, or in which foods or goods may be stored during or after transportation for a considerable length of time.

This invention further aims to provide a device which may be used for transporting goods, for instance, by rolling the device from or to freight cars, or trucks or ships, or from a home to a near-by storage establishment without reloading or repacking. Thus by loading the freight securely on the device, transportation is made easier and safer.

Another object of the invention is to provide a portable device for storing or transporting goods or foods with novel means whereby the goods or foods stored therein may be enclosed in a reasonably tight chamber.

Still another object of the invention is to provide a portable device for storing or transporting goods or foods in a tight chamber into which suitable disinfectants or gases may be injected, by convenient means.

Another object of the invention is the provision of a device for storing or transporting goods or foods which can be readily disassembled and folded up into a very compact space when, for instance, the device is being returned empty.

Yet another object of the invention is the provision of a device which is relatively simple in construction, durable and very efficient in its use, readily moved about and inexpensive to manufacture.

To the accomplishment of these and such other objects as may hereafter appear the invention consists of the novel construction, combination and arrangement of parts herein specifically described and illustrated in the accompanying drawings, wherein is shown an embodiment of the invention, but it is to be understood that changes, variations and modifications may be resorted to, which come within the scope of the claim hereunto appended.

In the drawings wherein like numerals of reference designate corresponding parts throughout the several views.

Figure 4 is a bottom view of the device showing alternative arrangement for supplying fluid thereto.

Figure 5 is a front view of the platform showing the arrangements of the rollers, casters, lifting jacks and the tie rings.

Figure 6 shows a front view of a modified arrangement of the pipe connections as shown in Figure 4 of the drawings.

Referring now to the various figures, the numeral 10 indicates the complete device which comprises, in general, a wheeled platform 11, a plurality of stanchions 12 and a flexible hood or cover 13.

Figure 2:
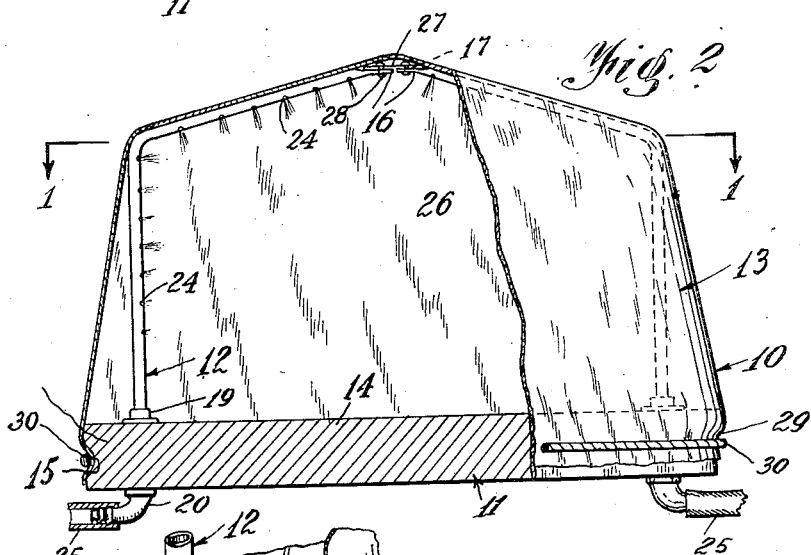
Figure 2 is a front view of the device, partly in section and partly in outline.
Figure 3:
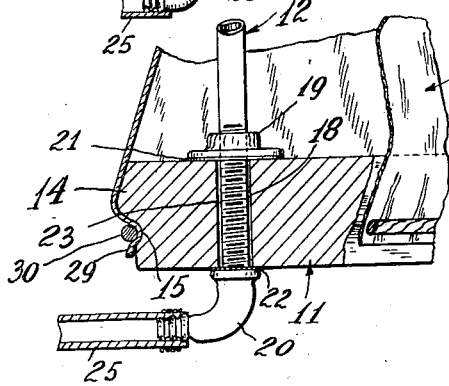
Figure 3 is an enlarged detail view of the portion in which one of the stanchions is shown assembled to the platform, it also shows the method of securing the flexible covering to the edge of the platform.

The said platform 11 comprises a preferably rounded base 14 of any suitable material and thickness, the edge of which is provided with a peripheral groove 15, as shown in Figures 2 and 3, securely mounted on said platform 11 are shown four, upright hollow stanchions 12 extending upwardly to a suitable height and then bent inwardly, as shown in Figure 2. Each of said stanchions is provided at its upper terminal with a flattened portion 16 having an aperture 17, while the lower end 18 of said stanchion 12 is threaded to receive the flange 19 and the hose-elbow 20. In order to provide a tight joint between the platform 11 and said flange 19 and hose-elbow 20, gaskets 21 and 22 are inserted under the flange 19 and over the elbow 20 respectively. Each of the lower ends 18 of said stanchions 12 is inserted in an aperture 23 of the platform 11 and held rigidly in position by tightening said flange and elbow against the platform 11, as will be understood.

A plurality of spray-holes 24 is distributed along the stanchions 12 in any suitable manner, to obtain quick distribution of the gas.

Figure 1:
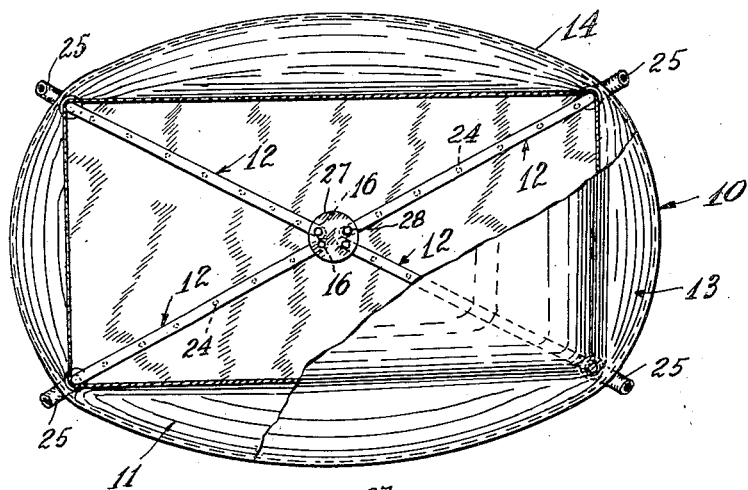
Figure 1 represents a top plan view of the complete device, the flexible fabric covering being shown cut along line 1—1 in Figure 2.

As shown in Figures 1, 2 and 3 inclusive, each of the four hose-elbows 20 may be provided with a flexible hose 25 by means of which gas, air or suitable chemicals may be injected or extracted into or from the chamber 26, which will be described later.

The flattened portions 16 of said stanchions 12 are united in a manner as shown in Figures 1 and 2 by means of a plate 27 and bolts 28 after which the hood or cover 13 is stretched over the stanchions 12 and the lower part 29 of said hood securely tied by a rope 30 or other suitable means to the edge 31 of the platform 11. To obtain a tight joint, said edge 31 is provided with a circumferential groove 15 for obvious reason.

After said hood 13 is assembled as described the latter and the platform 11 forms a reasonably tight chamber 26 which now may be charged with air, gas, chemicals or other suitable substances and by closing the valve 33 such substances may be retained in the chamber 26 for a long time and may be renewed when required.

In Figures 4 and 5 there are shown a pair of wheels 34 and a pair of casters 35 of standard design to facilitate moving of the device. A pair of jacks 32 are also provided and mounted to the underside of platform 11 to steady the device on the ground while loading or removing the goods from the platform 11.

Figures 4 and 6 show how a more permanent arrangement of pipes may be connected under the platform when the device is placed in a storage warehouse for a long period of time and gas is to be injected at regular intervals.

Anchor-rings 36 and ropes 37 are also provided to enable the goods to be tied to the platform if desired.

It is believed that this invention opens an entirely new field for transporting, transferring or storing goods, or foods and the same may be used for disinfecting furniture, bedding, clothing, etc., especially after certain contagious sicknesses and many other uses. It is not intended that any substantial gas pressure above that of the atmosphere, be employed, inside the device, when in use. Pressure inside and outside the enclosed chamber should be approximately equal, to avoid seepage and loss of gas.

I claim:

A transportation device for carrying and storing goods comprising a platform, running gear for movably supporting the platform, a frame detachably secured to said platform, a hood of flexible gas tight material enveloping and carried by said frame and defining a storage space on said platform, means for cooperating with the edge of the platform to secure the lower edge of the hood around the platform, hollow stanchions forming the frame and each having openings distributed along the length thereof, and means whereby the stanchions may be supplied with a fluid preservative, the supplying means being carried by the platform and arranged in the space normally provided by the running gear spacing the platform from a supporting surface.

WILLIAM J. DILLNER.